US008826461B2

(12) United States Patent
Yu et al.

(10) Patent No.: US 8,826,461 B2
(45) Date of Patent: Sep. 2, 2014

(54) METHOD AND SYSTEM FOR PROTECTING DATA, STORAGE DEVICE, AND STORAGE DEVICE CONTROLLER

(75) Inventors: Hsiang-Hsiung Yu, Taipei County (TW); Yu-Chung Shen, Kaohsiung County (TW); Yun-Chieh Chen, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 928 days.

(21) Appl. No.: 12/623,227

(22) Filed: Nov. 20, 2009

(65) Prior Publication Data

US 2011/0067118 A1   Mar. 17, 2011

(30) Foreign Application Priority Data

Sep. 15, 2009   (TW) .............................. 98131096 A

(51) Int. Cl.
*G06F 21/00*   (2013.01)
*G11B 20/00*   (2006.01)
*G06F 21/78*   (2013.01)
*G11B 20/10*   (2006.01)

(52) U.S. Cl.
CPC   *G11B 20/00833* (2013.01); *G11B 2020/10935* (2013.01); *G11B 2020/10944* (2013.01); *G11B 2020/10759* (2013.01); *G11B 2220/17* (2013.01); *G11B 2020/10694* (2013.01); *G11B 20/00695* (2013.01); *G06F 21/78* (2013.01); *G11B 20/00086* (2013.01); *G11B 2020/10833* (2013.01)
USPC .................. 726/32; 726/22; 726/26; 711/163; 713/165

(58) Field of Classification Search
USPC .................. 726/22, 26, 32; 711/163; 713/165
See application file for complete search history.

(56) References Cited

U.S. PATENT DOCUMENTS

| | | | |
|---|---|---|---|
| 6,453,391 B2 * | 9/2002 | Morita et al. ................. | 711/141 |
| 6,598,112 B1 * | 7/2003 | Jordan et al. ...................... | 711/2 |
| 7,095,853 B2 * | 8/2006 | Morishita ..................... | 380/201 |
| 7,181,560 B1 * | 2/2007 | Grand et al. .................. | 710/300 |
| 7,398,364 B2 * | 7/2008 | Maruyama et al. ........... | 711/162 |
| 7,555,769 B1 * | 6/2009 | Shapiro et al. .................... | 726/1 |
| 7,873,790 B2 * | 1/2011 | Bouchou et al. .............. | 711/135 |
| 8,223,580 B2 * | 7/2012 | Parkinson ................ | 365/230.06 |
| 8,272,059 B2 * | 9/2012 | Freeman ........................ | 726/24 |
| 2005/0147033 A1 * | 7/2005 | Chin et al. .................... | 370/229 |
| 2005/0175177 A1 * | 8/2005 | Van Vugt ...................... | 380/201 |
| 2007/0079050 A1 * | 4/2007 | Reckless et al. .............. | 711/100 |
| 2007/0083724 A1 * | 4/2007 | Kitamura ...................... | 711/163 |

(Continued)

FOREIGN PATENT DOCUMENTS

| | | |
|---|---|---|
| CN | 1292922 | 4/2001 |
| CN | 1343932 | 4/2002 |
| JP | 2008305465 | 12/2008 |

*Primary Examiner* — Christopher Revak
*Assistant Examiner* — Sarah Su
(74) *Attorney, Agent, or Firm* — J.C. Patents

(57) ABSTRACT

A method and a system for protecting data, a storage device, and a storage device controller are provided. In the present method, when a host accesses data in the storage device, whether the host performs a play operation or a copy operation on the data is first determined. If the host performs the play operation on the data, the storage device continues to execute the play operation so as to allow the host to access the data. On the other hand, if the host performs the copy operation on the data, the storage device executes an interference procedure so as to prevent or retard the data from being copied into the host.

29 Claims, 9 Drawing Sheets

(56) References Cited

U.S. PATENT DOCUMENTS

| | | | |
|---|---|---|---|
| 2007/0143827 A1* | 6/2007 | Nicodemus et al. | 726/2 |
| 2007/0204115 A1* | 8/2007 | Abramson | 711/154 |
| 2011/0066818 A1* | 3/2011 | Yu et al. | 711/162 |
| 2011/0083188 A1* | 4/2011 | Ahuja | 726/24 |
| 2011/0138487 A1* | 6/2011 | Cohen et al. | 726/32 |
| 2011/0307724 A1* | 12/2011 | Shaw et al. | 713/323 |
| 2012/0131686 A1* | 5/2012 | Risan et al. | 726/32 |
| 2012/0204238 A1* | 8/2012 | Ittah et al. | 726/4 |

* cited by examiner

METHOD AND SYSTEM FOR PROTECTING DATA, STORAGE DEVICE, AND STORAGE DEVICE CONTROLLER

CROSS-REFERENCE TO RELATED APPLICATION

This application claims the priority benefit of Taiwan application serial no. 98131096, filed on Sep. 15, 2009. The entirety of the above-mentioned patent application is hereby incorporated by reference herein and made a part of specification.

BACKGROUND

1. Field of the Invention

The present invention generally relates to a method and a system for protecting data, and more particularly, to a method and a system for preventing a host from copying data in a storage device, the storage device, and a storage device controller.

2. Description of Related Art

Along with the development of technologies, portability has become one of the major factors besides storage capacity to be considered when a consumer chooses a storage medium. After the invention of flash drives with plug-and-play and hot-swap features, the conventional storage media (for example, 3.5" floppy disks and compact disks (CDs)) originally used for storing and transferring data has gradually faded in popularity due to their small storage capacities and inconvenience.

A flash drive offers a light weight, a small size, a slim appearance, and a high portability, and it is very convenient to write data into or read data from a flash drive as long as the computer system has a compatible transmission interface. In addition, the storage capacity of flash drive has been greatly increased along with the advancement of flash memory, and people have become used to store data in flash drives so that data exchange has become very convenient. For example, many users are used to store video/audio files in flash drives so that they can enjoy their favourite videos/audios through any private or public computer.

However, since a flash drive can be conveniently carried around and the data stored therein can be easily copied, it is very easy to copy the data into a computer system. This is very disadvantageous to those copyright holders for their copyrighted products could be illegally copied.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data protection method that can prevent data in a storage device from being easily copied into a host.

The present invention is directed to a data protection system that can increase the difficulty of copying data from a storage device into a host.

The present invention is directed to a storage device which ensures that data stored therein will not to be easily copied into a host.

The present invention is directed to a storage device controller for effectively controlling a storage device, so as to prevent data stored in the storage device from being copied into a host.

The present invention provides a data protection method for protecting data stored in a storage device when a host accesses the data. In the data protection method, a reading objective of the host toward the data in the storage device is first determined. Then, two or more reading responses are provided according to the determination result.

According to an exemplary embodiment of the present invention, while determining the reading objective of the host toward the data in the storage device, whether the host performs a play operation or a copy operation on the data is determined. While providing two or more reading responses according to the determination result, if it is determined that the host performs the play operation on the data, the storage device continues to execute the play operation so as to allow the host to access the data, and if it is determined that the host performs the copy operation on the data, the storage device executes an interference procedure so as to prevent or retard the data from being copied into the host.

According to an exemplary embodiment of the present invention, the step of determining whether the host performs the play operation or the copy operation on the data includes determining whether the host performs the play operation or the copy operation on the data according to a data output quantity of the storage device, wherein the data output quantity may be a data flow value measured at a specific time or an average data flow value measured within a specific time period.

According to an exemplary embodiment of the present invention, the step of determining whether the host performs the play operation or the copy operation on the data according to the data output quantity includes following steps. First, a flow velocity threshold is defined, and the data output quantity of the storage device is measured at intervals of a sampling duration within the specific time period, wherein the specific time period is longer than the sampling duration. Then, an average flow velocity is calculated by using all the data output quantities measured within the specific time period. It is determined that the host performs the play operation on the data if the average flow velocity is smaller than the flow velocity threshold, and it is determined that the host performs the copy operation on the data if the average flow velocity is larger than or equal to the flow velocity threshold.

According to an exemplary embodiment of the present invention, the step of defining the flow velocity threshold includes defining the flow velocity threshold according to the type of a predetermined file format or a transmission interface of the storage device.

According to an exemplary embodiment of the present invention, at least a part of a storage unit in the storage device is divided into a plurality of storage spaces, wherein each of the storage spaces is corresponding to a flow velocity standard, and the data is stored in one of the storage spaces. The step of defining the flow velocity threshold includes serving the flow velocity standard corresponding to the storage space containing the data as the flow velocity threshold.

According to an exemplary embodiment of the present invention, the data protection method further includes storing at least one host instruction executed by the storage device or instruction information corresponding to the host instruction within a predetermined duration before determining whether the host performs the play operation or the copy operation on the data, wherein the instruction information contains at least the type of the host instruction and the data length processed by the host instruction.

According to an exemplary embodiment of the present invention, the step of determining whether the host performs the play operation or the copy operation on the data includes counting a total number of reading instructions sent by the host to the storage device within a unit time and determining whether the host performs the play operation or the copy operation on the data according to the total number. For example, it is determined that the host performs the play operation on the data if the total number is larger than or equal to a predetermined value, and it is determined that the host performs the copy operation on the data if the total number is smaller than the predetermined value.

According to an exemplary embodiment of the present invention, the step of determining whether the host performs the play operation or the copy operation on the data includes obtaining a plurality of reading instructions continuously sent by the host to the storage device. It is determined that the host performs the copy operation on the data if a total number of the reading instructions is larger than or equal to a predetermined number and all the read data lengths respectively corresponding to the reading instructions are larger than a predetermined length.

According to an exemplary embodiment of the present invention, the step of determining whether the host performs the play operation or the copy operation on the data includes defining a first data quantity and a second data quantity according to the type of the transmission interface between the host and the storage device, wherein the second data quantity is larger than the first data quantity. It is determined that the host performs the play operation on the data if the difference between a data reading quantity of the host and the first data quantity is smaller than the difference between the data reading quantity and the second data quantity, and it is determined that the host performs the copy operation on the data if the difference between the data reading quantity and the first data quantity is larger than the difference between the data reading quantity and the second data quantity, wherein the data reading quantity may be the quantity of data to be read by a single reading instruction or an average value of the quantities of data to be read by multiple reading instructions.

According to an exemplary embodiment of the present invention, the interference procedure includes sending a message back to the host, wherein the message is a media changed message, a read failure message, a cyclic redundancy check (CRC) error message, an error-correcting code (ECC) error message, or a non-existent storage medium message.

According to an exemplary embodiment of the present invention, the interference procedure includes executing an infinite loop to enter a system-down state.

According to an exemplary embodiment of the present invention, the interference procedure includes transmitting the data to the host at a predetermined rate.

According to an exemplary embodiment of the present invention, the step of executing the interference procedure by the storage device further includes executing the interference procedure within a predetermined interference time and continuing to determine whether the host performs the play operation or the copy operation on the data after the predetermined interference time elapses.

According to an exemplary embodiment of the present invention, the step of determining whether the host performs the play operation or the copy operation on the data further includes determining whether the data accessed by the host is system data and only determining whether the host performs the play operation or the copy operation on the data when the data is not system data. For example, whether the data is system data is determined according to a logical address of the data.

According to an exemplary embodiment of the present invention, the step of determining whether the host performs the play operation or the copy operation on the data further includes defining a buffer time and only determining whether the host performs the play operation or the copy operation on the data after the buffer time elapses.

According to an exemplary embodiment of the present invention, the step of determining whether the host performs the play operation or the copy operation on the data further includes determining whether the data accessed by the host is within a specific storage space of the storage unit in the storage device and only determining whether the host performs the play operation or the copy operation on the data when the data is within the specific storage space.

The present invention provides a data protection system including a host and a storage device. The storage device includes a storage unit and a storage device controller, wherein the storage unit is used for storing data, and the storage device controller is coupled to the storage unit. When the host is coupled to the storage device for accessing the data, the storage device controller determines whether the host performs a play operation or a copy operation on the data. If the storage device controller determines that the host performs the play operation on the data, the storage device continues to execute the play operation so as to allow the host to access the data, and if the storage device controller determines that the host performs the copy operation on the data, the storage device executes an interference procedure so as to prevent or retard the data from being copied into the host.

The present invention provides an external storage device including a connector, a storage unit, and a storage device controller. The storage unit is divided into at least a first storage space and a second storage space, and the first storage space and the second storage space respectively store a data. The storage device controller is coupled to the connector and the storage unit. When the host is coupled to the external storage device through the connector to access the data in the first storage space, the storage device controller determines a reading objective of the host toward the data in the first storage space, and when the host is coupled to the external storage device through the connector to access the data in the second storage space, the storage device controller directly allows the host to access the data without determining the reading objective of the host toward the data in the second storage space.

According to an exemplary embodiment of the present invention, when the host is coupled to the external storage device through the connector to access the data, the storage device controller determines whether the host performs a play operation or a copy operation on the data. If the storage device controller determines that the host performs the play operation on the data, the external storage device continues to execute the play operation so as to allow the host to access the data, and if the storage device controller determines that the host performs the copy operation on the data, the external storage device executes an interference procedure so as to prevent or retard the data from being copied into the host.

According to an exemplary embodiment of the present invention, the external storage device further includes a storage device for storing at least one host instruction executed by the external storage device within a predetermined duration and instruction information corresponding to the host instruction.

The present invention provides a storage device controller for receiving instructions from a host and controlling a storage unit in a storage device. The storage device controller includes a microprocessor unit, a storage medium interface unit, a host interface unit, and a data protection unit. The storage medium interface unit is coupled to the microprocessor unit for coupling the storage device controller to the storage unit. The host interface unit is coupled to the microprocessor unit for coupling the storage device controller to the host. The data protection unit is coupled to the microprocessor unit. When the host is coupled to the storage device to access data in the storage unit, the data protection unit determines whether the host performs a play operation or a copy operation on the data. If the data protection unit determines that the host performs the play operation on the data, the storage device continues to execute the play operation so as to allow the host to access the data, and if the data protection unit determines that the host performs the copy operation on the data, the storage device executes an interference procedure to prevent or retard the data from being copied into the host.

As described above, in the present invention, when a host is connected to a storage device to access data stored therein, whether the data accessing operation is a play operation or a copy operation is determined. If the data accessing operation is determined to be a copy operation, the data is not transmitted to the host or transmitted to the host at an extremely slow rate. Accordingly, it is made very difficult to copy the data from the storage device into the host. Thereby, the purpose of data protection is achieved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
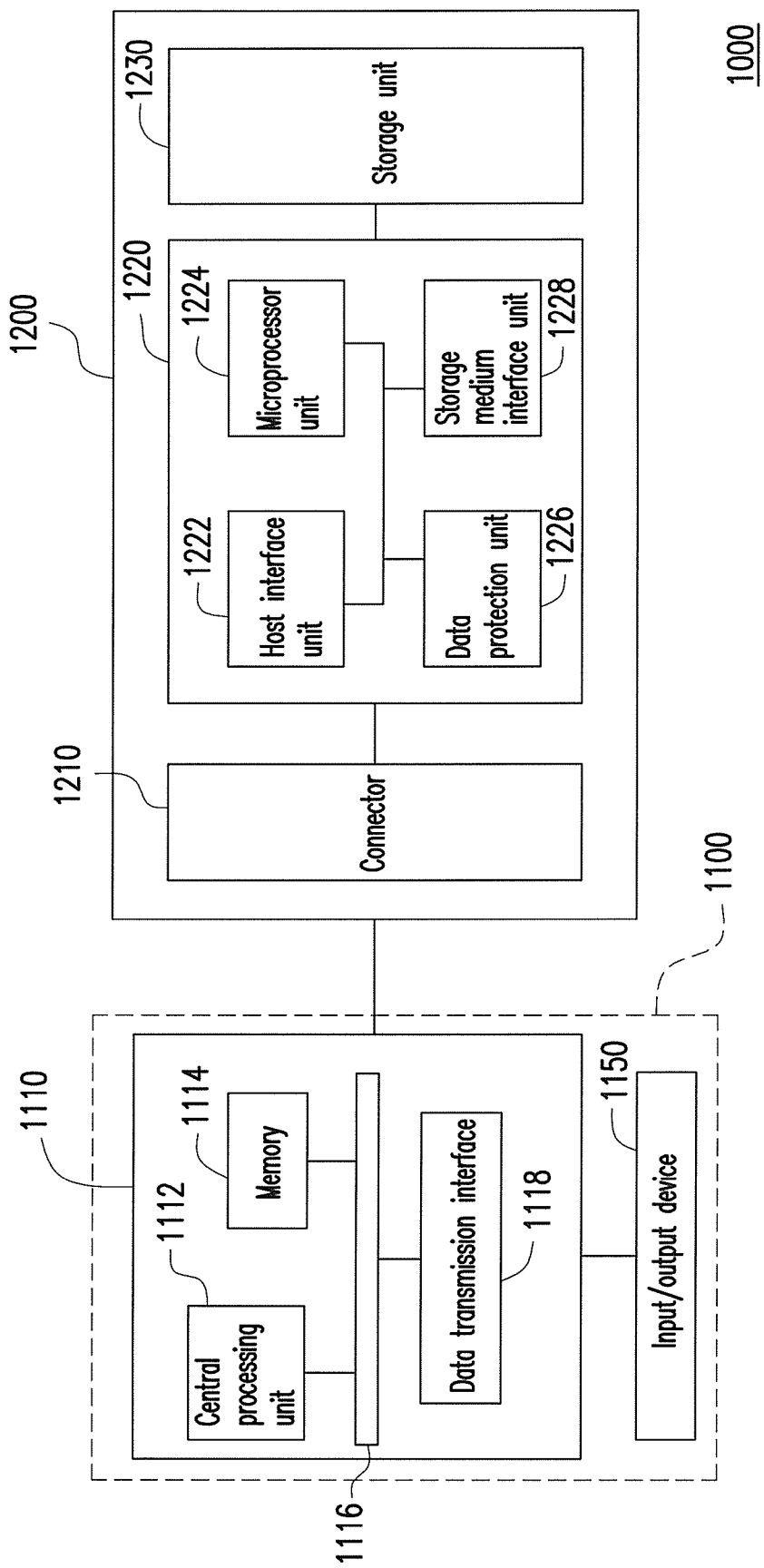
FIG. 1 is a block diagram of a data protection system according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In following exemplary embodiments, how to provide a corresponding response according to different accessing action performed by a host on data stored in a storage device so as to protect the data is described, wherein the host may be any device that can play music, videos, or other contents (for example, e-books and e-maps, etc), such as a computer, a cell phone, a multimedia player, an audio device, a handheld mobile device, a global positioning system (GPS) navigator, or an e-book, and the storage device may be built in the host or externally connected to the host.

FIG. 1 is a block diagram of a data protection system according to an exemplary embodiment of the present invention. As shown in FIG. 1, the data protection system 1000 includes a host system 1100 and an external storage device 1200. For the convenience of description, in the present exemplary embodiment, the host system 1100 is assumed to be a computer system and which includes a computer host 1110 and an input/output (I/O) device 1150. However, in other exemplary embodiments, the host in the host system 1100 may also be any other device that can play music, videos, or other contents (for example, e-books and e-maps, etc), such as a cell phone, a multimedia player, an audio device, a handheld mobile device, a GPS navigator, or an e-book. Besides, even though in the present exemplary embodiment, the storage device is described as the external storage device 1200, in other exemplary embodiments, the storage device may also be built in the host system 1100 without departing the scope of the present invention.

Figure 2:
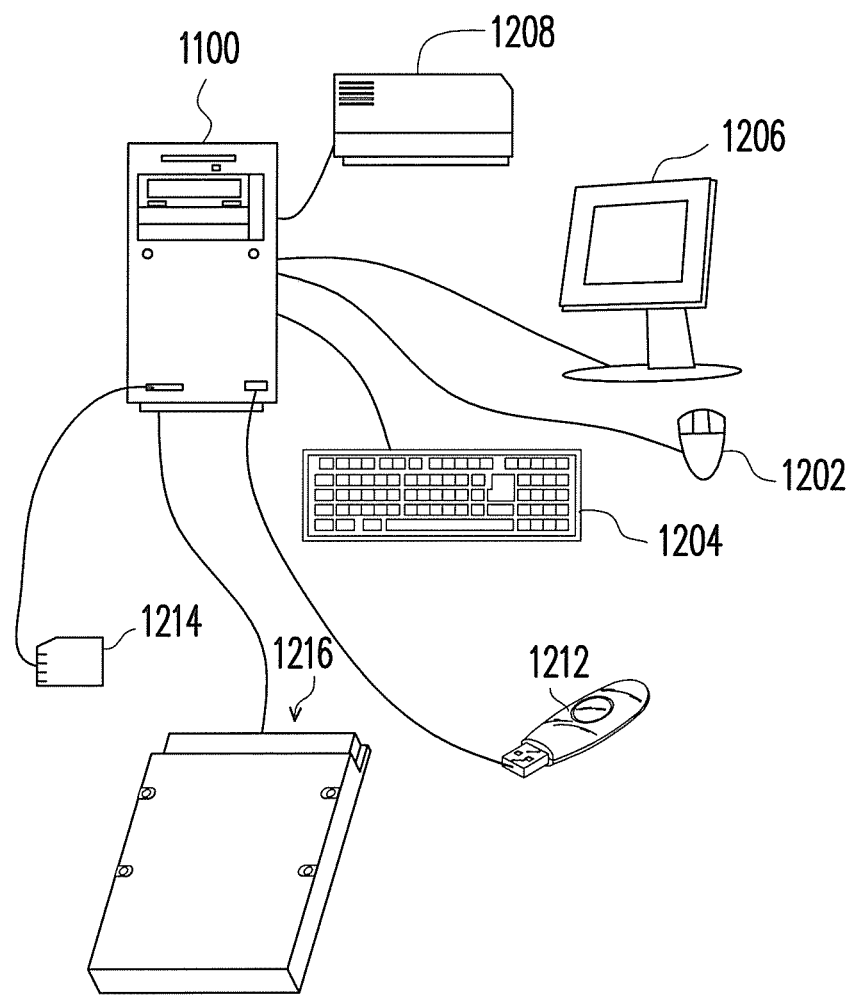
FIG. 2 is a diagram of a computer host, an input/output (I/O) device, and an external storage device according to an embodiment of the present invention.

In the present exemplary embodiment, the computer host 1110 includes a central processing unit (CPU) 1112, a memory 1114, a system bus 1116, and a data transmission interface 1118. The I/O device 1150 may be a mouse 1202, a keyboard 1204, a display 1206, or a printer 1208, as shown in FIG. 2. However, the type of the I/O device 1150 is not limited herein.

The external storage device 1200 includes a connector 1210, a storage device controller 1220, and a storage unit 1230. The external storage device 1200 may be a flash drive 1212, a memory card 1214, or a solid state drive (SSD) 1216, as shown in FIG. 2. The external storage device 1200 may also be any storage device that can be externally connected to the computer host 1110, such as a flash drive that can simulate a CD ROM or a DVD ROM.

The external storage device 1200 could be connected to the computer host 1110 through the connector 1210 and the data transmission interface 1118 so that the computer host 1110 can read data from or write data into the storage unit 1230. In the present exemplary embodiment, the connector 1210 and the data transmission interface 1118 are universal serial bus (USB) interfaces. However, in other exemplary embodiments, the connector 1210 and the data transmission interface 1118 may be any other suitable interfaces, such as serial advanced technology attachment (SATA) interfaces, Institute of Electrical and Electronic Engineers (IEEE) 1394 interfaces, peripheral component interconnect express (PCI) interfaces, or secure digital (SD) interfaces. However, the type of the connector 1210 and the data transmission interface 1118 is not limited herein.

The storage unit 1230 may be a flash memory (a NAND flash memory) and which is used for storing system data (for example, a file allocation table (FAT)) and general data (for example, video/audio files or text files, etc).

The storage device controller 1220 is respectively coupled to the connector 1210 and the storage unit 1230. In the present exemplary embodiment, the storage device controller 1220 includes a host interface unit 1222, a microprocessor unit 1224, a data protection unit 1226, and a storage medium interface unit 1228. The storage device controller 1220 is coupled to the computer host 1110 through the host interface unit 1222 and the connector 1210 so as to receive instructions and data from the computer host 1110 and send data back into the computer host 1110. In the present exemplary embodiment, the host interface unit 1222 is a USB interface, and in other embodiments, the host interface unit 1222 may be a SATA interface, an IEEE 1394 interface, a PCI express interface, a SD interface, other flash memory card interfaces, or an interface unit conforming to other interface standard. However, it should be noted that the host interface unit 1222, the connector 1210, and the data transmission interface 1118 have to conform to the same or compatible interface standard in order to transmit data to each other.

The storage device controller 1220 is coupled to the storage unit 1230 through the storage medium interface unit 1228 so as to control the storage unit 1230. In the present exemplary embodiment, the storage medium interface unit 1228 is a flash memory interface unit.

As shown in FIG. 1, the host interface unit 1222, the data protection unit 1226, and the storage medium interface unit 1228 are all coupled to the microprocessor unit 1224. The microprocessor unit 1224 is the main control unit of the storage device controller 1220, and which cooperates with the host interface unit 1222, the storage medium interface unit 1228, and the data protection unit 1226 to carry out various operations of the external storage device 1200.

In the present exemplary embodiment, when the external storage device 1200 is coupled to the computer host 1110 and processes data in the storage unit 1230 according to a reading instruction received from the computer host 1110, the data protection unit 1226 determines whether the computer host 1110 is about to perform a play operation or a copy operation on the data and provides a corresponding response according to the determination result. To be specific, the computer host 1110 is allowed to access the data only when the data protection unit 1226 determines that the computer host 1110 performs a play operation on the data. If the data protection unit 1226 determines that the computer host 1110 performs a copy operation on the data, the external storage device 1200 does not output the data or transmits the data relatively slowly to the computer host 1110 so as to prevent the data in the storage unit 1230 from being easily and instantly copied into the computer host 1110.

Figure 3:
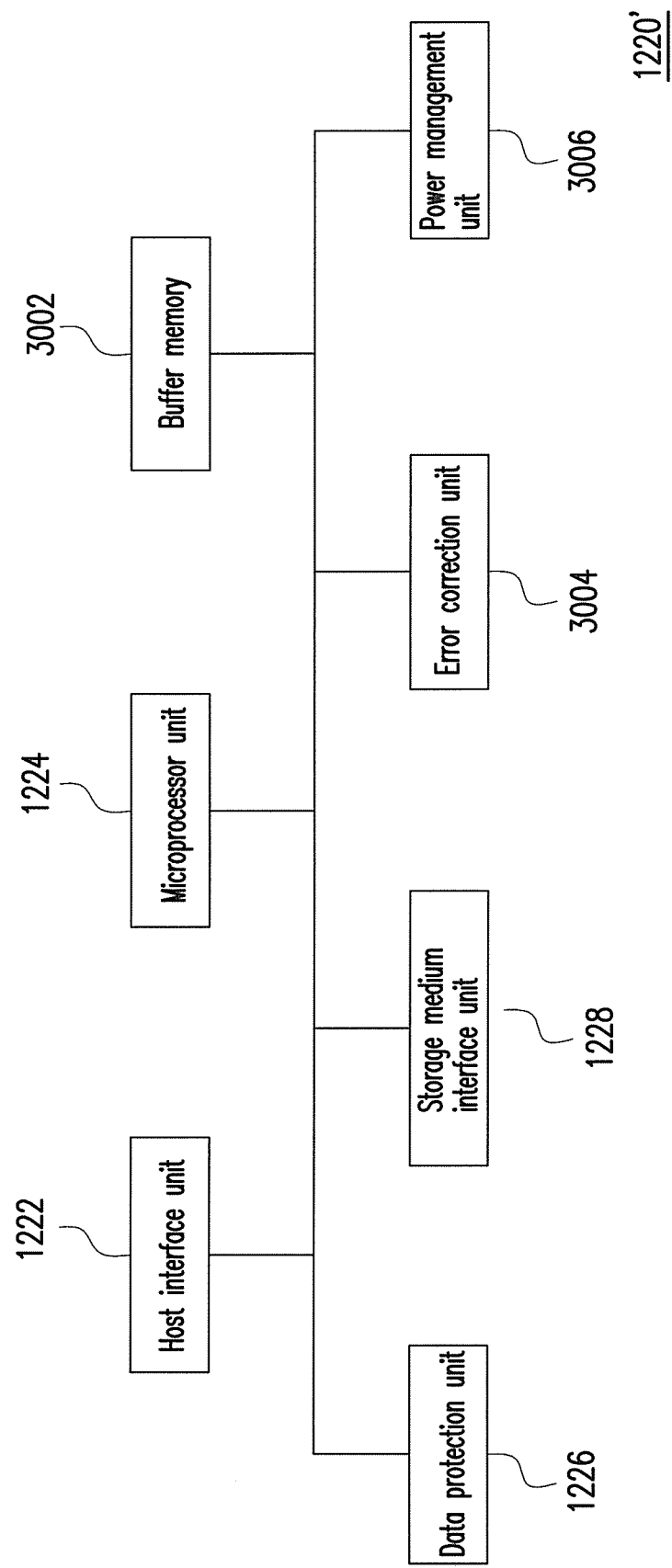
FIG. 3 is a block diagram of a storage device controller according to another exemplary embodiment of the present invention.

In another exemplary embodiment of the present invention, the storage device controller in the external storage device further includes other functional modules. FIG. 3 is a block diagram of a storage device controller according to another exemplary embodiment of the present invention. Referring to FIG. 3. Besides including the host interface unit 1222, the microprocessor unit 1224, the data protection unit 1226, and the storage medium interface unit 1228, the storage device controller 1220' further includes a buffer memory 3002, an error correction unit 3004, and a power management unit 3006.

To be specific, the buffer memory 3002 is coupled to the microprocessor unit 1224 and used for temporarily storing data received from the computer host 1110 or the storage unit 1230.

The error correction unit 3004 is coupled to the microprocessor unit 1224 and which executes an error correction procedure to ensure data accuracy. To be specific, when the storage device controller 1220' receives a writing instruction from the computer host 1110, the error correction unit 3004 generates an error correcting code (ECC) corresponding to the data to be written by the writing instruction, and the data and the corresponding ECC are both written into the storage unit 1230. When the storage device controller 1220' receives a reading instruction from the computer host 1110, the storage device controller 1220' reads the data and the ECC corresponding to the reading instruction from the storage unit 1230, and then the error correction unit 3004 corrects the data according to the ECC.

The power management unit 3006 is coupled to the microprocessor unit 1224 for supplying power to the external storage device.

Figure 4:
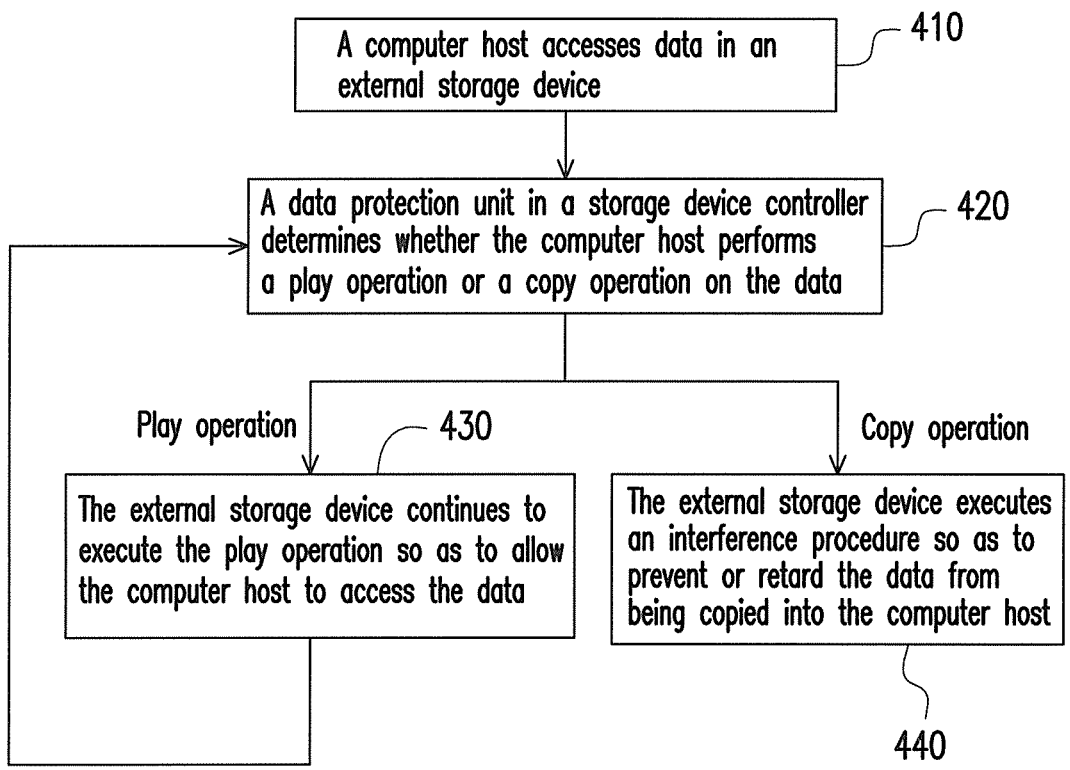
FIG. 4 is a flowchart of a data protection method according to an exemplary embodiment of the present invention.

Referring to FIG. 1 again, the operation process of the data protection system 1000 when the computer host 1110 accesses the data in the external storage device 1200 after the external storage device 1200 is coupled to the computer host 1110 will be further described with reference to another exemplary embodiment of the present invention. FIG. 4 is a flowchart of a data protection method according to an exemplary embodiment of the present invention. Please refer to both FIG. 1 and FIG. 4 for following description.

After the external storage device 1200 is coupled to the computer host 1110, in step 410, the computer host 1110 plays or copies the data stored in the storage unit 1230 of the external storage device 1200 by issuing a reading instruction to the external storage device 1200.

Then, in step 420, the data protection unit 1226 in the storage device controller 1220 determines whether the computer host 1110 performs a play operation or a copy operation on the data read from the external storage device 1200. It should be noted that the play operation in the present disclosure refers to that the computer host 1110 only plays the data after it reads the data from the external storage device 1200 into the computer host 1110 but does not write the data into another non-volatile memory storage device (for example, a hard disk (HDD) of the computer host 1110, a flash memory card, or a flash drive) other than the external storage device 1200, and the copy operation refers to that after the computer host 1110 reads the data from the external storage device 1200 into the computer host 1110, it writes the data into another non-volatile memory storage device other than the external storage device 1200, wherein the other non-volatile memory storage device may be disposed in the computer host 1110 or externally connected to the computer host 1110. Generally speaking, the external storage device 1200 has different data output quantity when it is in different working state under the control of the computer host 1110. According to the statistic, when a user uses the computer host 1110 to play data in the external storage device 1200, the data output quantity of the external storage device 1200 is about 24 Kbyte/s if the data is in MP3 format, and the data output quantity of the external storage device 1200 is about 125 Kbyte/s if the data is in MP4 format. However, when the user copies data from the external storage device 1200 into the computer host 1110, the data output quantity of the external storage device 1200 may easily reach 8 Mbyte/s. In other words, when the computer host 1110 plays the data in the external storage device 1200, the data output quantity of the external storage device 1200 is smaller than that when the user copies the data from the external storage device 1200 into the computer host 1110. Thus, in the present exemplary embodiment, the data protection unit 1226 determines whether the computer host 1110 performs a play operation or a copy operation on the data according to the data output quantity of the external storage device 1200.

Figure 5:
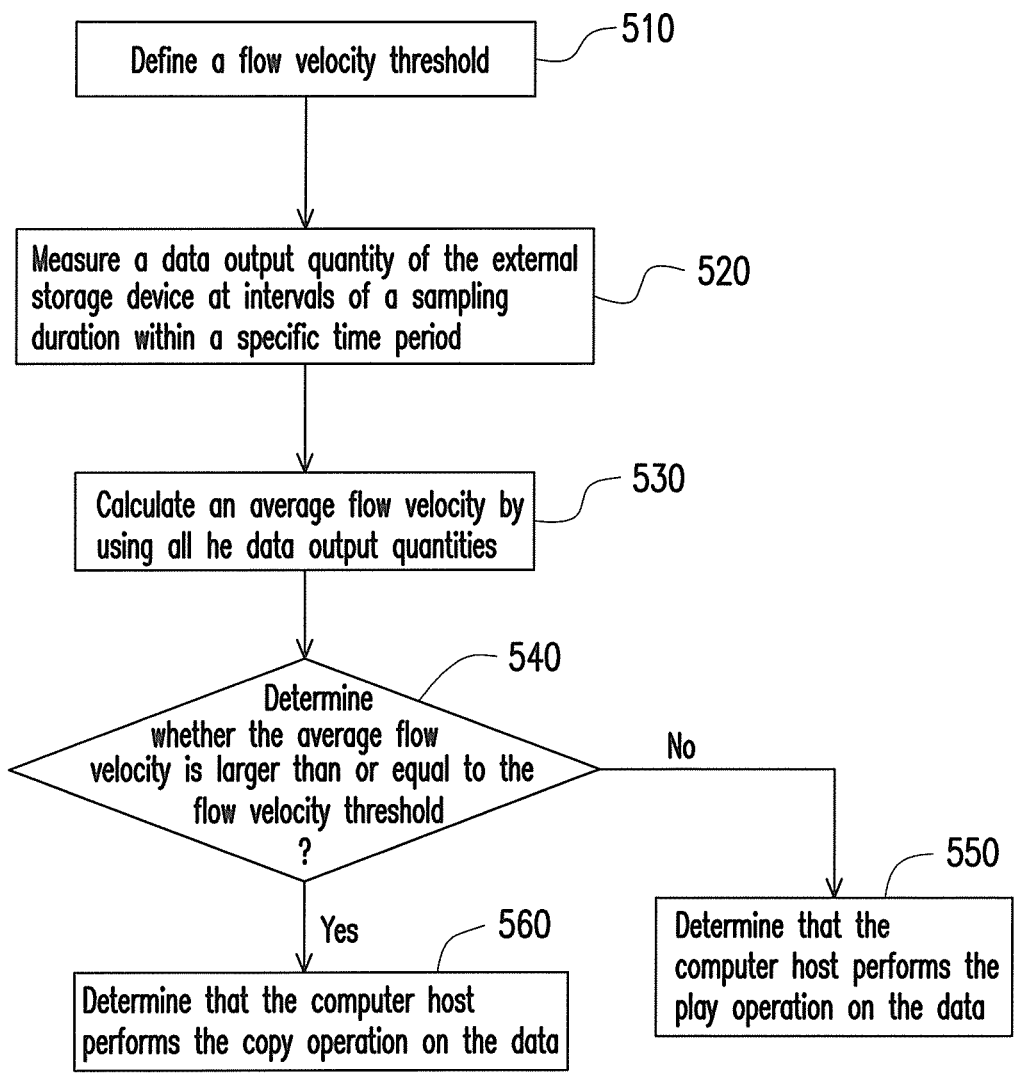
FIG. 5 is a flowchart illustrating how to determine whether a computer host performs a play operation or a copy operation on a data according to an exemplary embodiment of the present invention.

FIG. 5 is a flowchart illustrating how to determine whether a computer host performs a play operation or a copy operation on a data according to an exemplary embodiment of the present invention. Namely, FIG. 5 further illustrates details of step 420 in FIG. 4. In the present exemplary embodiment, the data output quantity is defined as a data flow value measured within a specific time period, or data transmission speed measured during at least a part of data output operation period. It should be noted that the data output quantity could be an average, a sum or a mathematically operated number of the data flow value measured within a specific time period. First, in step 510, the data protection unit 1226 defines a flow velocity threshold, wherein the flow velocity threshold may be a common predetermined value or related to the interface or function of the external storage device 1200. It is assumed that the external storage device 1200 is exclusively used for storing data conforming to a predetermined file format, and the data protection unit 1226 defines the flow velocity threshold according to the predetermined file format. For example, the flow velocity threshold may be defined as 50 Kbyte/s if the external storage device 1200 is exclusively used for storing data conforming to the MP3 format, and the flow velocity threshold may be defined as 150 Kbyte/s if the external storage device 1200 is exclusively used for storing data conforming to the MP4 format. In addition, if the transmission interface of the external storage device 1200 is a PCI express interface, a SD interface, or a CF interface, the flow velocity threshold may vary along with the specified maximum transmission rate of the transmission interface when the play operation or the copy operation is performed on the data since these transmission interfaces have different maximum transmission rates. However, it should be noted that foregoing values of the flow velocity threshold are only examples used for describing the present invention but are not intended to limit the present invention, and the flow velocity threshold may be 1 Mbyte/s or 300 Kbyte/s, etc.

After defining the flow velocity threshold, in step 520, the data protection unit 1226 measures the data output quantity of the external storage device 1200 at intervals of a sampling duration within a specific time period, wherein the specific time period is longer than the sampling duration. Besides, in step 530, an average flow velocity within the specific time period is calculated by using all the data output quantities measured during this period. For example, assuming that the specific time period is 2 seconds and the sampling duration is 0.1 second, the data protection unit 1226 calculates the average value of 20 data output quantities measured within this 2 seconds. To be specific, in the present exemplary embodiment, the computer host 1110 only transmits a next host instruction after a host instruction previously transmitted to the external storage device 1200 is completed, and these host instructions executed by the external storage device 1200 (or the instruction information corresponding to the host instructions) are temporarily stored in a storage device (for example, the buffer memory 3002) of the external storage device 1200. The instruction information of a host instruction contains the type of the instruction (for example, read or write) or the data length to be processed. In another exemplary embodiment, the external storage device 1200 may only temporarily store the output data quantity within a predetermined duration. The data protection unit 1226 calculates the quantity of data output to the computer host 1110 during every sampling duration according to the instruction information recorded in the buffer memory 3002, so as to obtain the data output quantity during the specific time period.

Next, in step 540, the data protection unit 1226 determines whether the average flow velocity within the specific time period is larger than or equal to the flow velocity threshold. If the average flow velocity is smaller than the flow velocity threshold, in step 550, the data protection unit 1226 determines that the computer host 1110 performs the play operation on the data. If the average flow velocity is larger than or equal to the flow velocity threshold, in step 560, the data protection unit 1226 determines that the computer host 1110 performs the copy operation on the data.

In another exemplary embodiment, the data protection unit 1226 determines that the computer host 1110 performs the copy operation once the average flow velocity is larger than or equal to the flow velocity threshold a predetermined number of times (for example, twice or five times).

In another exemplary embodiment, the data protection unit 1226 determines that the computer host 1110 performs the copy operation once the quantity of data output to the computer host 1110 during a sampling duration is larger than or equal to a threshold a predetermined number of times (for example, three or four times).

It should be mentioned that in the present exemplary embodiment, the data protection unit 1226 does not recognize the computer host 1110 performs the copy operation immediately once the data output quantity is larger than a threshold. Instead, whether the computer host 1110 performs the play operation or the copy operation on the data is determined mainly according to the data output quantity and the data output continuity. Accordingly, even when the computer host 1110 just starts to access the data and accordingly reads a large quantity of data to store in a buffer, it won't be determined as a data copy operation through the steps illustrated in FIG. 5.

In another exemplary embodiment, when the data protection unit 1226 determines whether the computer host 1110 performs the play operation or the copy operation on the data according to the data output quantity of the external storage device 1200, the data output quantity used herein may also refer to a data flow value measured within a specific duration. When the data flow value is larger than or equal to a predetermined value, the data protection unit 1226 determines that the computer host 1110 performs the copy operation on the data. For example, the data protection unit 1226 measures the data flow every second, and the data protection unit 1226 determines that the computer host 1110 performs the copy operation on the data when the data flow value is larger than or equal to a predetermined value.

Referring to FIG. 4 again, when the data protection unit 1226 determines that the computer host 1110 performs the play operation on the data (i.e., the computer host 1110 plays the data), in step 430, the external storage device 1200 continues to execute this play operation so as to allow the computer host 1110 to continuously access the data in the storage unit 1230. After that, the operation flow of the data protection method returns to step 420 so that the data protection unit 1226 determines again whether the data is played or copied.

However, when the data protection unit 1226 determines that the computer host 1110 performs the copy operation on the data, in step 440, the external storage device 1200 executes an interference procedure to prevent or retard the data from being copied into the computer host 1110. In the present exemplary embodiment, the interference procedure executed by the external storage device 1200 includes sending a message back to the computer host 1110, wherein the message may be a message like a media changed message (not ready to ready transition), a cyclic redundancy check (CRC) error message, an error-correcting code (ECC) error message, a read failure message, or a non-existent storage medium message, etc. The computer host 1110 cannot perform the data copy operation any longer after it receives this message.

In another exemplary embodiment, the interference procedure executed by the external storage device 1200 may be an infinite loop such that the external storage device 1200 enters a system-down state. In this case, the external storage device 1200 does not take any data access operation unless the user re-connects the external storage device 1200 to the computer host 1110.

In still another exemplary embodiment, the interference procedure executed by the external storage device 1200 may be transmitting the data into the computer host 1110 at a predetermined extremely slow rate so that the data cannot be quickly copied into the computer host 1110.

In other exemplary embodiments, in order to prevent a user from copying data by a low-speed transmission interface, the external storage device 1200 does not send the data into the computer host 1110 once the data protection unit 1226 in the storage device controller 1220 determines that the connector 1210 of the external storage device 1200 is a USB transmission interface and conforms to the USB 1.1 standard with a lower transmission rate.

Figure 6:
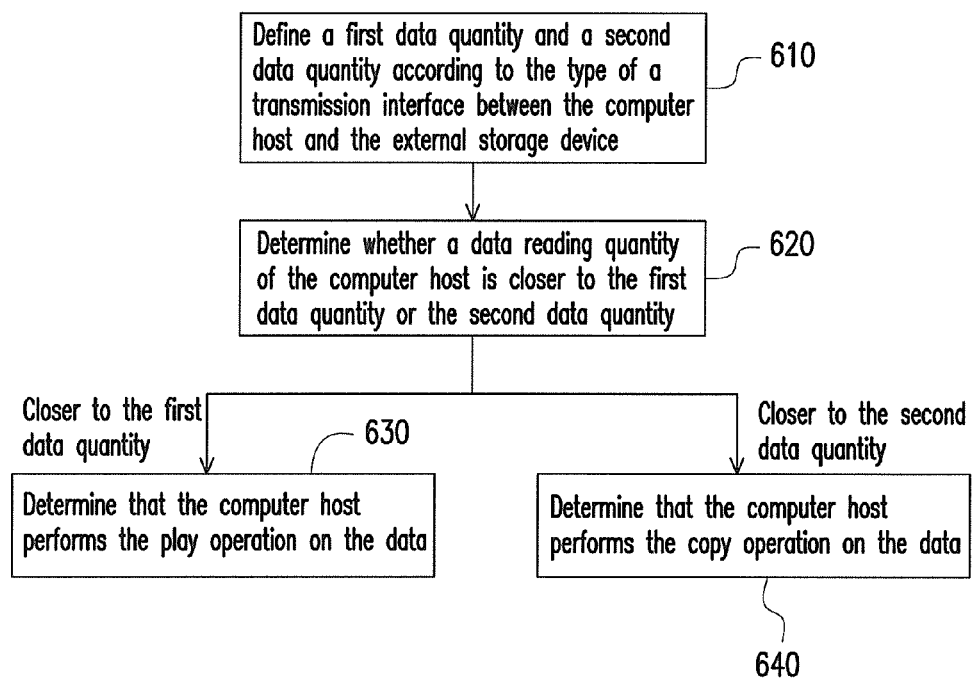
FIG. 6 is a flowchart illustrating how to determine whether a computer host performs a play operation or a copy operation on a data according to another exemplary embodiment of the present invention.

In the exemplary embodiments described above, whether a data is simply play or copied is determined according to the data output quantity. However, the present invention is not limited thereto. In other words, any other technique that can distinguish a data playing operation and a data copying operation may also be applied to the data protection system 1000. FIG. 6 is a flowchart illustrating how to determine whether a computer host performs a play operation or a copy operation on a data according to another exemplary embodiment of the present invention. In the present embodiment, when the data protection unit 1226 is about to determine whether the computer host 1110 performs a play operation or a copy operation on the data, in step 610, the data protection unit 1226 first defines a first data quantity and a second data quantity according to the type of the transmission interfaces between the computer host 1110 and the external storage device 1200 (i.e., the type of the transmission interfaces corresponding to the connector 1210 and the data transmission interface 1118), wherein the second data quantity is larger than the first data quantity. For example, when the transmission interfaces corresponding to the connector 1210 and the data transmission interface 1118 are USB interfaces, the first data quantity is defined as 4 KB and the second data quantity is defined as 64 KB.

Then, in step 620, the data protection unit 1226 determines whether the data reading quantity of the computer host 1110 is closer to the first data quantity or the second data quantity. To be specific, the computer host 1110 requests the external storage device 1200 to send data back from the storage unit 1230 by issuing a reading instruction, and since the quantities of data required by a play operation and a copy operation are different, the data protection unit 1226 can determine whether the computer host 1110 performs the play operation or the copy operation on the data according to the data reading quantity of the reading instruction. However, it should be noted that herein the data reading quantity may be the quantity of data to be read by a single reading instruction or the average quantity of data to be read by multiple reading instructions.

If the difference between the data reading quantity and the first data quantity is smaller than the difference between the data reading quantity and the second data quantity, it is determined that the data reading quantity is closer to the first data quantity, so that in step 630, the data protection unit 1226 determines that the computer host 1110 performs the play operation on the data.

Contrarily, if the difference between the data reading quantity and the first data quantity is larger than the difference between the data reading quantity and the second data quantity, it is determined that the data reading quantity is closer to the second data quantity, so that in step 640, the data protection unit 1226 determines that the computer host 1110 performs the copy operation on the data.

It should be noted again that in the embodiments described above, whether the data is played or copied is determined respectively according to the continuous data output quantity of the external storage device 1200 and the data quantity desired every time to be read by the computer host 1110. However, these two determination methods are only embodiment examples of the present invention but not intended to limit the scope thereof.

Figure 7:
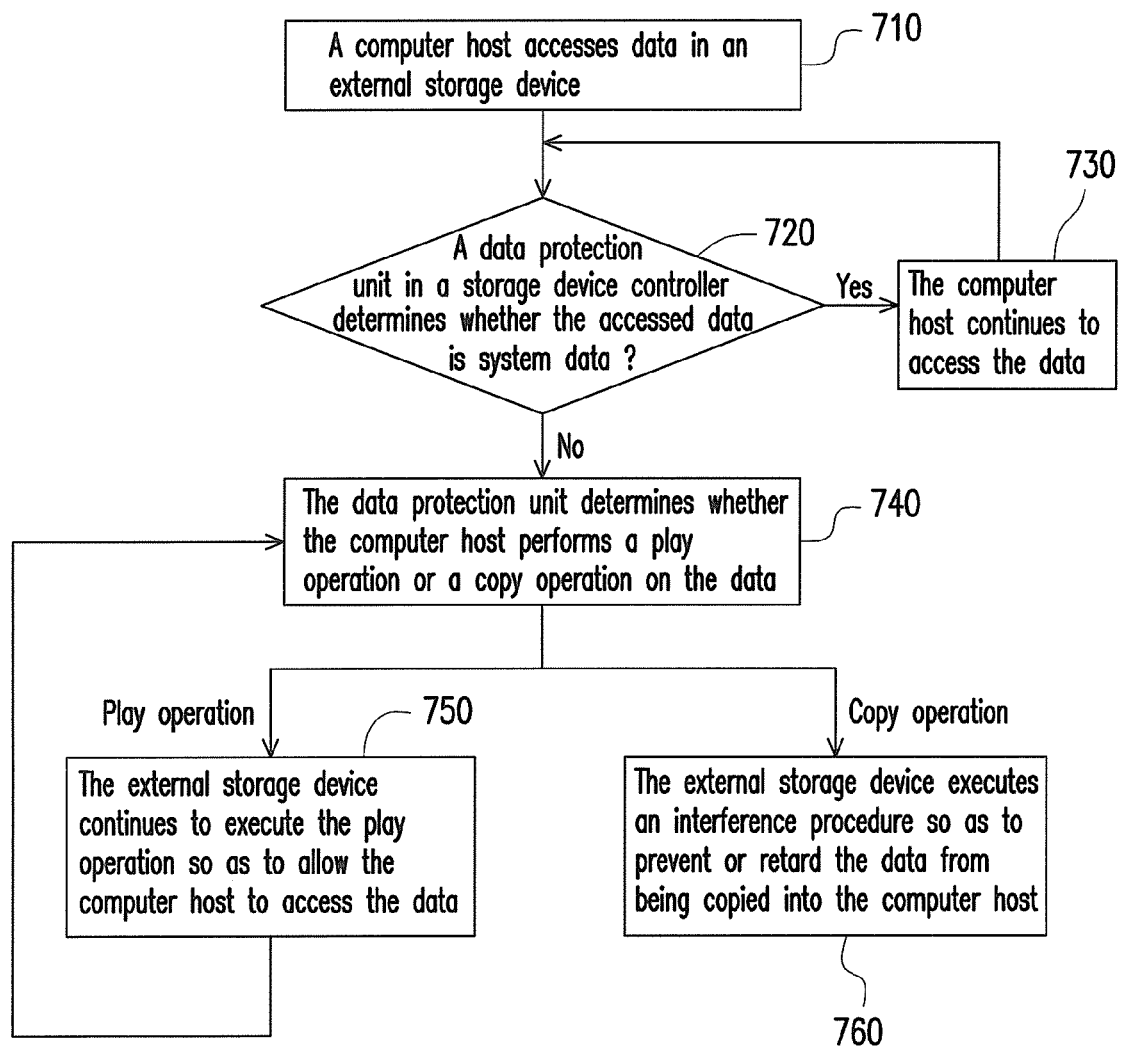
FIG. 7 is a flowchart of a data protection method according to another exemplary embodiment of the present invention.

It should be mentioned that when the computer host 1110 reads system data (for example, a FAT) from the storage unit 1230, the data flow velocity of the external storage device 1200 for sending the data back to the computer host 1110 is higher than that for playing the data. Thus, as shown in FIG. 7, to avoid mistakenly determining the play operation or the copy operation, when the external storage device 1200 is coupled to the computer host 1110 and the computer host 1110 accesses the data in the storage unit 1230 (step 710), the data protection unit 1226 has to determine whether the data to be accessed by the computer host 1110 is system data (step 720). If the currently accessed data is system data, the data protection unit 1226 does not determine whether the computer host 1110 performs the play operation or the copy operation on the data, and the computer host 1110 is allowed to access the data continuously (step 730). Step 720 is repeated until the currently accessed data is not system data. The data protection unit 1226 then determines whether the computer host 1110 performs the play operation or the copy operation on the data (step 740). The steps 740~760 illustrated in FIG. 7 are the same as or similar to the steps 420~440 illustrated in FIG. 4 therefore will not be described herein. To be specific, because system data can be stored in a block at a specific logical address or the storage device controller 1220 can detect the logical address of the block containing the system data, the data protection unit 1226 in the storage device controller 1220 can determine whether the data is system data according to the logical address to be accessed In addition, because the computer host 1110 usually reads the system information from the storage unit 1230 first when it is coupled to the external storage device 1200, in another exemplary embodiment, the data protection unit 1226 first defines a buffer time and does not monitor the data flow before the time since the computer host 1110 is coupled to the external storage device 1200 exceed aforementioned buffer time, and the data protection unit 1226 only determines whether the computer host 1110 performs the play operation or the copy operation on the data after the buffer time elapses.

Figure 8:
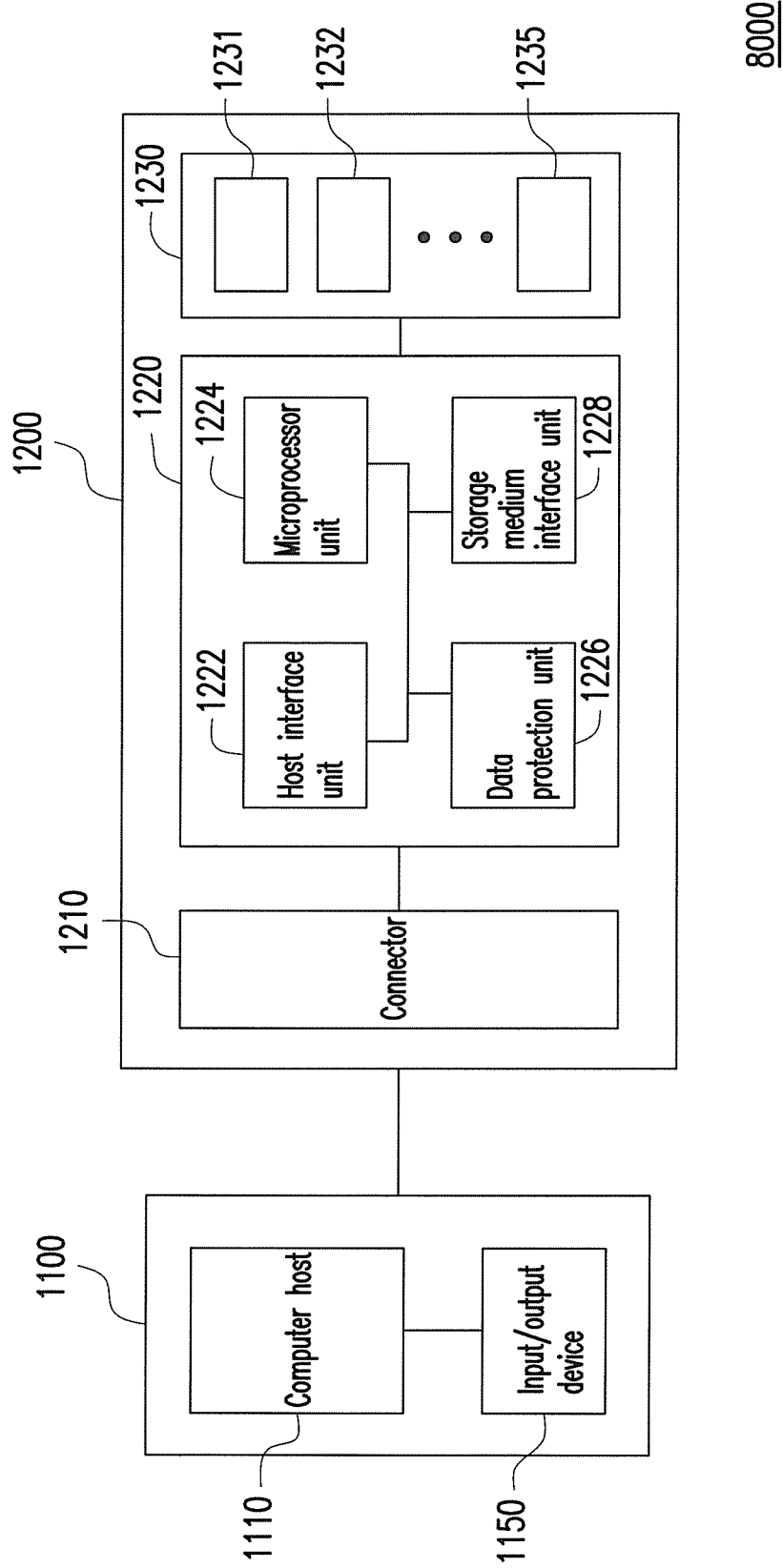
FIG. 8 is a block diagram of a data protection system according to another exemplary embodiment of the present invention.

FIG. 8 is a block diagram of a data protection system according to another exemplary embodiment of the present invention. The data protection system 8000 in FIG. 8 is similar to the data protection system 1000 in FIG. 1, and the difference between the two is that at least a part of the storage unit 1230 in the external storage device 1200 is divided into a plurality of storage spaces, and each of the storage spaces is corresponding to a flow velocity standard. Herein the number of the storage spaces is not limited, and in the present exemplary embodiment, the storage unit 1230 is divided into a storage space 1231, a storage space 1232, and a storage space 1235.

When the data protection unit 1226 determines whether the data is palyed or copied according to the continuous data output quantity of the external storage device 1200, the data protection unit 1226 can use the flow velocity standard corresponding to the storage space containing the data as the flow velocity threshold.

Besides, because the storage unit 1230 is divided into several storage spaces, in an exemplary embodiment, the data protection system 8000 protects the entire storage unit 1230. In another exemplary embodiment, the data protection system 8000 only protects specific storage spaces. Namely, when data in at least one storage space of the data protection system 8000 is read, the data protection system 8000 does not determine the reading objective of the computer host, and all reading requests received from the computer host are allowed. Meanwhile, when data in at least another one storage space of the data protection system 8000 is read, the data protection system 8000 determines the reading objective of the computer host and provides a corresponding response according to the determined result.

Figure 9:
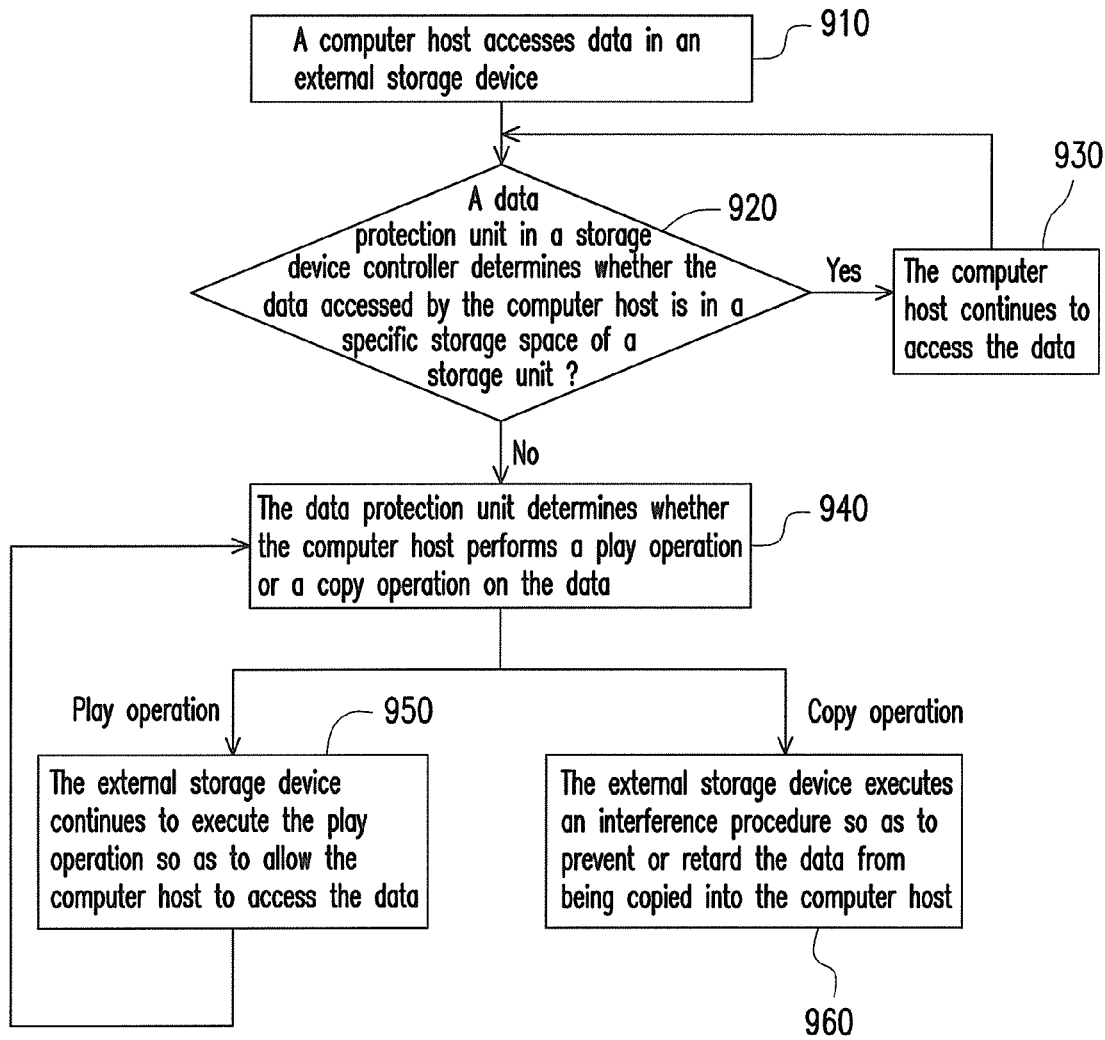
FIG. 9 is a flowchart of a data protection method according to yet another exemplary embodiment of the present invention.

FIG. 9 is a flowchart of a data protection method according to yet another exemplary embodiment of the present invention. First, in step 910, the external storage device 1200 is coupled to the computer host 1110 and the computer host 1110 accesses data in the storage unit 1230. Then, in step 920, the data protection unit 1226 has to determine whether the data accessed by the computer host 1110 is in a specific storage space of the storage unit 1230. If the currently accessed data is not in a specific storage space, the data protection unit 1226 does not determine the reading objective of the computer host 1110, and in step 930, the computer host 1110 is allowed to access the data. Next, step 920 is repeated until it is determined that the currently accessed data is in the specific storage space. Then, in step 940, the data protection unit 1226 determines whether the computer host 1110 performs a play operation or a copy operation on the data. The steps 940~960 in FIG. 9 are the same as or similar to the steps 420~440 in FIG. 4 therefore will not be described herein.

As shown in FIG. 9, only when a user accesses the data in the specific storage space of the storage unit 1230 through the computer host 1110, the data protection unit 1226 of the storage device controller 1220 takes action to monitor and protect the data. In other words, the user can store important data into the specific storage space of the storage unit 1230 to prevent the data from being copied by other people.

To be more specific, in an exemplary embodiment, the storage unit 1230 is divided into at least a first storage space (for example, the storage space 1231) and a second storage space (for example, the storage space 1232) and the first storage space and the second storage space respectively store data. When the computer host 1110 is coupled to the external storage device 1200 through the connector 1210 to read data from the first storage space, the data protection unit 1226 in the storage device controller 1220 determines a reading objective of the computer host 1110 toward the data in the first storage space. However, when the computer host 1110 is coupled to the external storage device 1200 and reads data from the second storage space, the data protection unit 1226 in the storage device controller 1220 directly allows the computer host 1110 to read the data without determining the reading objective of the computer host 1110 toward the data in the second storage space.

Namely, in the exemplary embodiment described above, the data protection system 8000 has at least one storage space on which it is not needed to determine the reading objective of the computer host 1110, and any reading request from the computer host 1110 on this storage space is directly allowed. Meanwhile, the data protection system 8000 has at least one storage space on which it is needed to determine the reading objective of the computer host 1110, and when the computer host 1110 accesses data in this storage space, the external storage device 1200 determines whether the computer host 1110 performs a play operation or a copy operation on the data through the method described above and provides a corresponding response according to the determination result.

In another exemplary embodiment, after the data protection unit 1226 determines that the computer host 1110 performs the copy operation on the data, the interference procedure executed by the external storage device 1200 is terminated after a predetermined interference time (for example, 5 seconds) so that the data protection unit 1226 continues to determine whether the computer host 1110 performs the play operation or the copy operation on data in the external storage device 1200.

In yet another exemplary embodiment, because when video/audio data is played, a predetermined quantity (for example, 8 Kbyte/s) of the data is continuously read and the predetermined data quantity is smaller than that when the data is copied (for example, 128 Kbyte/s), the data protection unit 1226 detects the instructions issued by the computer host 1110, and when a predetermined number of instructions are all reading instructions and the read data lengths corresponding to the reading instructions are all larger than a predetermined quantity, or when the number of continuous reading instructions is larger than a predetermined number and the read data lengths corresponding to the reading instructions are all larger than a predetermined quantity, the data protection unit 1226 determines that the computer host 1110 performs a copy operation on the data, and the external storage device 1200 executes an interference procedure.

In still another exemplary embodiment, because each reading instruction only transmits a small quantity of video/audio data, it is only executed for a short time. Accordingly, the reading instruction is issued many times during a unit time. The data protection unit 1226 detects the total number that the reading instruction is issued by the computer host 1110, and if the total number of the reading instruction issued during a unit time (for example, 0.1 second) is larger than or equal to a predetermined number, the data protection unit 1226 determines that the computer host 1110 performs a play operation on the data. Otherwise, the data protection unit 1226 determines that the computer host 1110 performs a copy operation on the data. In yet still another exemplary embodiment, the data protection unit 1226 determine the reading objective of the computer host 1110 by using both the total number of the reading instruction issued by the computer host 1110 and the data reading quantity of the computer host 1110. In still another exemplary embodiment, the data protection unit 1226 determines the reading objective of the computer host 1110 by calculating an average value of a determination factor (for example, the total number of the reading instructions and the data reading quantity, etc) within a predetermined period (for example, 1 second).

In other exemplary embodiment, if the reading objective of the host toward the data in the storage device is determined by checking whether the output flow velocity is within a predetermined range, (for example, 128 to 256 Kbytes every 128 millisecond (ms)), no interference procedure is executed, (for example, the numbers of bytes have already been sent by the external storage device 1200 between 0 and 127 Kbytes or between 128 and 256 Kbytes). However, while the output flow velocity is larger than the predetermined range, an interference procedure (retard the data by adding a delay time) is executed. For example, while the numbers of bytes have already been sent by the external storage device 1200 between 257 and 512 Kbytes, the data protection unit 1226 adds extra 128 ms as a delay time of sending the data by the external storage device 1200. While the numbers of bytes have already been sent between 512 and 1024 Kbytes, the data protection unit 1226 adds extra two times of 128 ins as the delay time of sending the data. While the numbers of bytes have already been sent out between 1024 to 2048 Kbytes, the data protection unit 1226 adds extra seven times of 128 ms as the delay time, and so on. Accordingly, the data protection unit 1226 does not send any specific error message to the computer host 1110, but the purpose of protect data or limiting the data flow value can also be achieved to some extent.

It has to be emphasized again that even though a computer host and an external storage device are used for describing foregoing exemplary embodiments, the present invention is not limited thereto. In other exemplary embodiments, any host that can play music, videos, or other contents (for example, e-books and e-maps, etc), such as a cell phone, a multimedia player, an audio device, a handheld mobile device, a GPS navigator, or an e-book, may also be applied to the present invention, and the storage device may be built in the host besides being externally connected to the host. As long as the host accesses data in the storage device, the reading objective of the host toward the data has to be determined first, wherein the reading objective of the host may be determined according to the data output quantity of the storage device. After that, two or more reading responses are provided according to the determination result. Namely, the storage device executes an interference procedure according to the determination result so as to prevent or retard the data from being copied into the host.

As described above, in the present invention, when a host accesses data in a storage device, whether the host performs a play operation or a copy operation on the data is automatically determined. If it is determined that the host performs a copy operation on the data, the storage device does not send the data to the host or sends the data to the host at a slow rate. The previously described exemplary embodiments of the present invention have many advantages, including that the data in the storage device won't be easily copied into the host and the purpose of data protection is achieved, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data protection method, for protecting data stored in a storage device when a host accesses the data, the data protection method comprising:

receiving at least one reading instruction from the host by a storage device controller in the storage device;

executing the at least one reading instruction by the storage device controller in the storage device;

after executing the at least one reading instruction by the storage device controller, determining whether the host performs a play operation or a copy operation on the data stored in the storage device by the storage device controller in the storage device;

if the storage device controller determines that the host performs the play operation on the data, continuously executing the play operation on the storage device so as to allow the host to access the data by the storage device controller; and if the storage device controller determines that the host performs the copy operation on the data, executing an interference procedure to interfere the data stored in the storage device from being copied into the host by the storage device controller, wherein the step of determining whether the host performs the play operation or the copy operation on the data stored in the storage device comprises:

determining that the host performs the copy operation on the data when a total number of the at least one reading instruction is larger than or equal to a predetermined number and all read data lengths respectively corresponding to the at least one reading instruction are larger than a predetermined length.

2. The data protection method according to claim 1, wherein the interference procedure comprises preventing or retarding the data stored in the storage device from being copied into the host by the storage device controller.

3. The data protection method according to claim 2, wherein the interference procedure comprises sending a message back to the host.

4. The data protection method according to claim 3, wherein the message is a media changed message, a read failure message, a cyclic redundancy check (CRC) error message, an error-correcting code (ECC) error message, or a non-existent storage medium message.

5. The data protection method according to claim 2, wherein the interference procedure comprises executing an infinite loop to enter a system-down state.

6. The data protection method according to claim 2, wherein the interference procedure comprises transmitting the data to the host at a predetermined rate.

7. The data protection method according to claim 1, wherein the step of determining whether the host performs the play operation or the copy operation on the data stored in the storage device comprises:

determining whether the host performs the play operation or the copy operation on the data according to a data output quantity of the storage device.

8. The data protection method according to claim 7, wherein the data output quantity is a data flow value measured at a specific time.

9. The data protection method according to claim 7, wherein the data output quantity is an average data flow value measured within a specific time period.

10. The data protection method according to claim 9, wherein the step of determining whether the host performs the play operation or the copy operation on the data according to the data output quantity comprises:
  defining a flow velocity threshold;
  measuring the data output quantity of the storage device at intervals of a sampling duration within the specific time period, wherein the specific time period is longer than the sampling duration;
  calculating an average flow velocity by using all the data output quantities measured within the specific time period;
  determining that the host performs the play operation on the data if the average flow velocity is smaller than the flow velocity threshold; and
  determining that the host performs the copy operation on the data if the average flow velocity is larger than or equal to the flow velocity threshold.

11. The data protection method according to claim 10, wherein the step of defining the flow velocity threshold comprises:
  defining the flow velocity threshold according to a type of a predetermined file format or a transmission interface of the storage device.

12. The data protection method according to claim 10, wherein at least a part of a storage unit in the storage device is divided into a plurality of storage spaces, each of the storage spaces is corresponding to a flow velocity standard, the data is in one of the storage spaces, and the step of defining the flow velocity threshold comprises:
  serving the flow velocity standard corresponding to the storage space containing the data as the flow velocity threshold.

13. The data protection method according to claim 1, wherein before the step of determining whether the host performs the play operation or the copy operation on the data stored in the storage device, the data protection method further comprises:
  storing at least one host instruction executed by the storage device or an instruction information corresponding to the host instruction within a predetermined duration.

14. The data protection method according to claim 13, wherein the instruction information comprises at least one of a type of the host instruction and a data length processed by the host instruction.

15. The data protection method according to claim 1, wherein the step of determining whether the host performs the play operation or the copy operation on the data stored in the storage device comprises:
  counting a total number of the at least one reading instruction sent by the host to the storage device within a unit time; and
  determining whether the host performs the play operation or the copy operation on the data according to the total number.

16. The data protection method according to claim 15, wherein the step of determining whether the host performs the play operation or the copy operation on the data according to the total number comprises:
  determining that the host performs the play operation on the data if the total number is larger than or equal to a predetermined value; and
  determining that the host performs the copy operation on the data if the total number is smaller than the predetermined value.

17. The data protection method according to claim 1, wherein the step of executing the interference procedure by the storage device controller further comprises:
  executing the interference procedure within a predetermined interference time; and
  continuing to determine whether the host performs the play operation or the copy operation on the data after the predetermined interference time elapses.

18. The data protection method according to claim 1, wherein the step of determining whether the host performs the play operation or the copy operation on the data further comprises:
  determining whether the data accessed by the host is system data; and
  determining whether the host performs the play operation or the copy operation on the data if the data is not the system data.

19. The data protection method according to claim 18, wherein the step of determining whether the data accessed by the host is the system data comprises:
  determining whether the data is the system data according to a logical address of the data.

20. The data protection method according to claim 1, wherein the step of determining whether the host performs the play operation or the copy operation on the data further comprises:
  defining a buffer time; and
  determining whether the host performs the play operation or the copy operation on the data after the buffer time elapses.

21. The data protection method according to claim 1, wherein the step of determining whether the host performs the play operation or the copy operation on the data further comprises:
  determining whether the data accessed by the host is in a specific storage space of a storage unit in the storage device; and
  determining whether the host performs the play operation or the copy operation on the data if the data is in the specific storage space.

22. A data protection method, for protecting data stored in a storage device when a host accesses the data, the data protection method comprising:
  receiving at least one reading instruction from the host by a storage device controller in the storage device;
  executing the at least one reading instruction by the storage device controller in the storage device;
  after executing the at least one reading instruction by the storage device controller, determining whether the host performs a play operation or a copy operation on the data stored in the storage device by the storage device controller in the storage device;
  if the storage device controller determines that the host performs the play operation on the data, continuously executing the play operation on the storage device so as to allow the host to access the data by the storage device controller; and
  if the storage device controller determines that the host performs the copy operation on the data, executing an interference procedure to interfere the data stored in the storage device from being copied into the host by the storage device controller, wherein the step of determining whether the host performs the play operation or the copy operation on the data stored in the storage device comprises:

defining a first data quantity and a second data quantity according to a type of a transmission interface between the host and the storage device, wherein the second data quantity is larger than the first data quantity;

determining that the host performs the play operation on the data when a difference between a data reading quantity of the host and the first data quantity is smaller than a difference between the data reading quantity and the second data quantity; and determining that the host performs the copy operation on the data when the difference between the data reading quantity and the first data quantity is larger than the difference between the data reading quantity and the second data quantity.

23. The data protection method according to claim 22, wherein the data reading quantity is a data quantity to be read by a single reading instruction.

24. The data protection method according to claim 22, wherein the data reading quantity is an average value of data quantities to be read by multiple reading instructions.

25. A data protection system, comprising:
a host; and
a storage device, comprising:
a storage unit, for storing a data; and
a storage device controller in the storage device, coupled to the storage unit,
wherein when the host is coupled to the storage device to access the data, the storage device controller receives at least one reading instruction from the host, executes the reading instruction, and determines whether the host performs a play operation or a copy operation on the data stored in the storage device after executing the reading instruction,
if the storage device controller determines that the host performs the play operation on the data, the storage device controller continues to execute the play operation so as to allow the host to access the data,
if the storage device controller determines that the host performs the copy operation on the data, the storage device controller executes an interference procedure so as to prevent or retard the data stored in the storage device from being copied into the host,
wherein the storage device controller determines that the host performs the copy operation on the data when a total number of the at least one reading instruction is larger than or equal to a predetermined number and all read data lengths respectively corresponding to the at least one reading instruction are larger than a predetermined length.

26. An external storage device, comprising:
a connector;
a storage unit, divided into at least a first storage space and a second storage space, wherein the first storage space and the second storage space respectively store a data; and
a storage device controller in the external storage device, coupled to the connector and the storage unit,
wherein when a host is coupled to the external storage device through the connector to read the data stored in the first storage space, the storage device controller receives at least one reading instruction from the host, executes the reading instruction, and determines whether the host performs a play operation or a copy operation on the data stored in the first storage space after executing the reading instruction, wherein if the storage device controller determines that the host performs the play operation on the data, the storage device controller continues to execute the play operation on the external storage device so as to allow the host to access the data, and if the storage device controller determines that the host performs the copy operation on the data, the storage device controller executes an interference procedure to interfere the data stored in the first storage space from being copied into the host,
when the host is coupled to the external storage device through the connector to read the data stored in the second storage space, the storage device controller directly allows the host to read the data without determining whether the host performs the play operation or the copy operation on the data stored in the second storage space,
wherein the storage device controller determines that the host performs the copy operation on the data when a total number of the at least one reading instruction is larger than or equal to a predetermined number and all read data lengths respectively corresponding to the at least one reading instruction are larger than a predetermined length.

27. The external storage device according to claim 26, wherein the interference procedure comprises preventing or retarding the data stored in the first storage space from being copied into the host by the storage device controller.

28. The external storage device according to claim 26 further comprising:
a storage device, for storing at least one host instruction executed by the external storage device within a predetermined duration or an instruction information corresponding to the host instruction.

29. A storage device controller comprising:
a microprocessor unit;
a storage medium interface unit, coupled to the microprocessor unit for coupling the storage device controller to a storage unit of a storage device;
a host interface unit, coupled to the microprocessor unit for coupling the storage device controller to a host; and
a data protection unit, coupled to the microprocessor unit, receiving at least one reading instruction from the host, executing the reading instruction, and determining whether the host performs a play operation or a copy operation on a data stored in the storage unit when the host is coupled to the storage device for accessing the data after executing the read instruction,
wherein if the data protection unit determines that the host performs the play operation on the data, the storage device controller continues to execute the play operation so as to allow the host to access the data,
if the data protection unit determines that the host performs the copy operation on the data, the storage device controller executes an interference procedure so as to prevent or retard the data from being copied into the host,
wherein the storage device controller defines a first data quantity and a second data quantity according to a type of a transmission interface between the host and the storage device, wherein the second data quantity is larger than the first data quantity,
wherein the storage device controller determines that the host performs the play operation on the data when a difference between a data reading quantity of the host and the first data quantity is smaller than a difference between the data reading quantity and the second data quantity,
wherein the storage device controller determines that the host performs the copy operation on the data when the difference between the data reading quantity and the first data quantity is larger than the difference between the data reading quantity and the second data quantity.

* * * * *